US012603988B2

(12) United States Patent
Chen et al.

(10) Patent No.: US 12,603,988 B2
(45) Date of Patent: Apr. 14, 2026

(54) END-TO-END SAFETY MECHANISM FOR DISPLAY SYSTEM

(71) Applicant: XILINX, INC., San Jose, CA (US)

(72) Inventors: Yanran Chen, San Jose, CA (US); Roger May, Banbury (GB); Sagheer Ahmad, Cupertino, CA (US); Qingyi Sheng, San Jose, CA (US); Krishnan Srinivasan, San Jose, CA (US); Vishal Sagar, Navi Mumbai (IN); Pramod Bhardwaj, San Jose, CA (US); Yashu Gosain, Hyderabad (IN)

(73) Assignee: XILINX, INC., San Jose, CA (US)

( * ) Notice: Subject to any disclaimer, the term of this patent is extended or adjusted under 35 U.S.C. 154(b) by 54 days.

(21) Appl. No.: 18/241,161

(22) Filed: Aug. 31, 2023

(65) Prior Publication Data

US 2025/0080716 A1     Mar. 6, 2025

(51) Int. Cl.
H04N 17/00         (2006.01)

(52) U.S. Cl.
CPC ................................. H04N 17/004 (2013.01)

(58) Field of Classification Search
CPC .............................. G09G 5/377; H04N 19/36
See application file for complete search history.

(56) References Cited

U.S. PATENT DOCUMENTS

| | | | | | |
|---|---|---|---|---|---|
| 6,731,625 | B1 * | 5/2004 | Eastep | ................... | H04M 7/128 |
| | | | | | 379/93.07 |
| 2003/0043910 | A1 * | 3/2003 | Akiyoshi | ............... | H04N 19/51 |
| | | | | | 375/E7.11 |
| 2004/0001547 | A1 * | 1/2004 | Mukherjee | ............. | H04N 19/36 |
| | | | | | 375/240.03 |
| 2005/0135390 | A1 * | 6/2005 | Anderson | ........... | H04L 65/1069 |
| | | | | | 370/401 |
| 2008/0141131 | A1 * | 6/2008 | Cerny | ..................... | G06F 3/048 |
| | | | | | 345/545 |
| 2022/0020340 | A1 * | 1/2022 | Wiercienski | ........... | G09G 5/377 |

* cited by examiner

*Primary Examiner* — Getente A Yimer

(74) *Attorney, Agent, or Firm* — Patterson + Sheridan, LLP

(57) ABSTRACT

Some examples described herein provide for display image data reliability and safety, for example end-to-end safety methods, apparatuses, and systems for display systems. One example includes a method, including replacing video frames from input video streams with a set of test frames. The method further includes generating an alpha-blended video stream based on the set of test frames and the input video streams. The method further includes generating and inserting cyclic redundancy check (CRC) information for the set of test frames into secondary data packets associated with the alpha-blended video stream. The method further includes processing the set of test frames and video frames by a display controller to generate an output video stream. The method further includes performing an error detection procedure for the set of test frames using the CRC information to detect an error associated with the set of video frames.

20 Claims, 10 Drawing Sheets

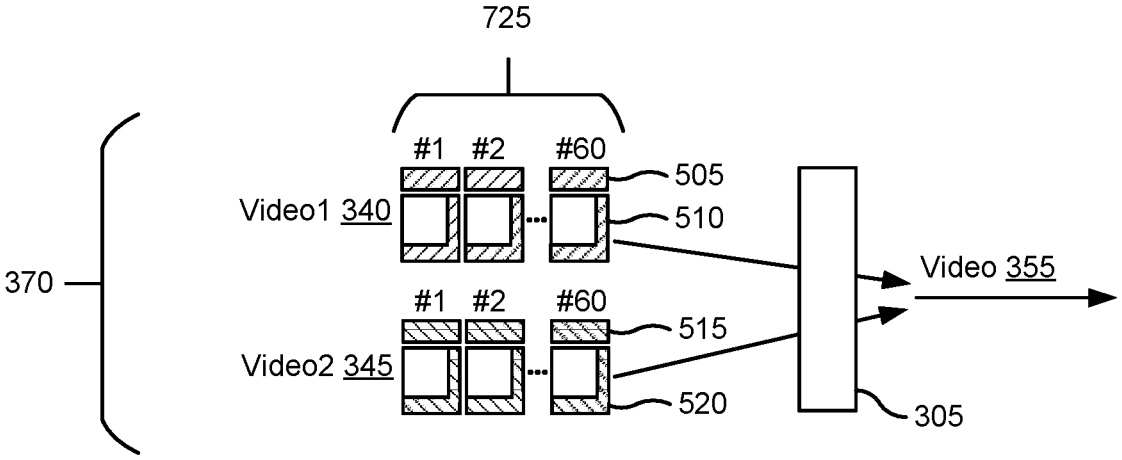
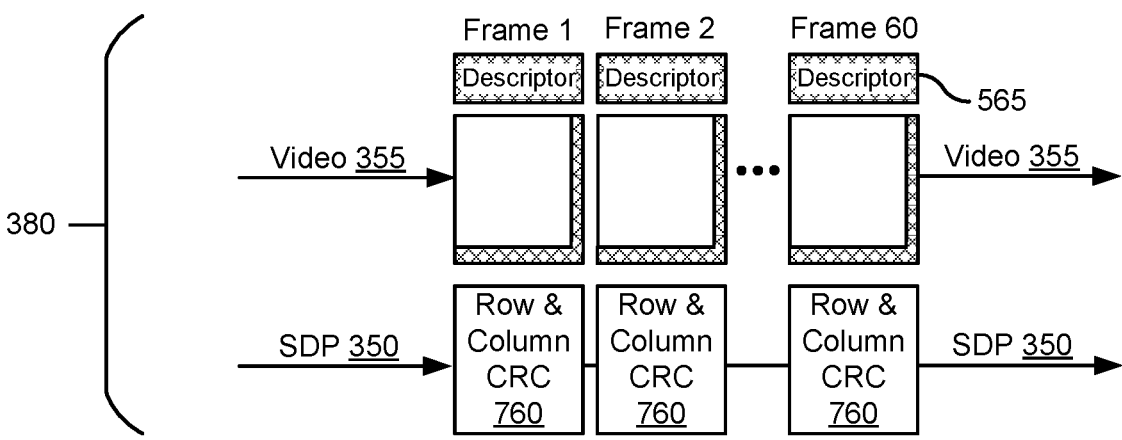
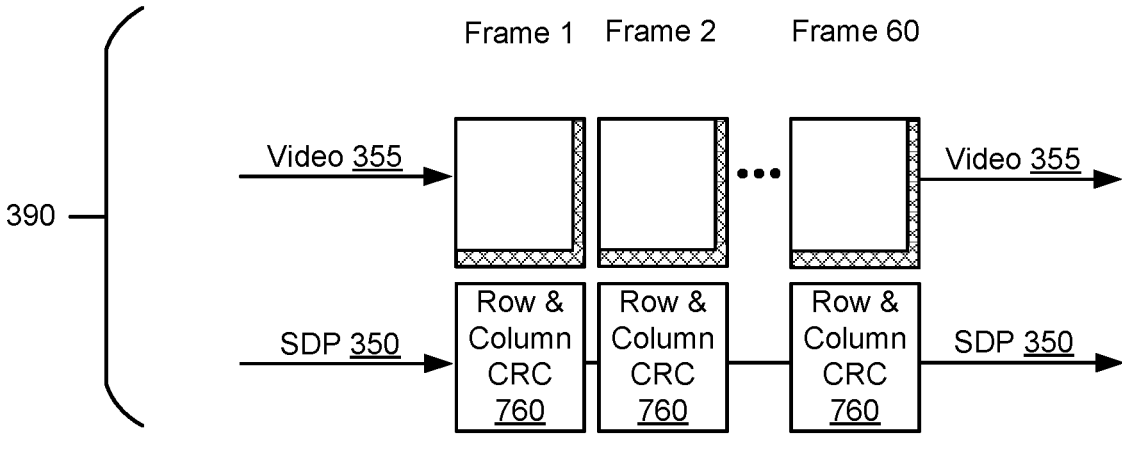
FIG. 7
700

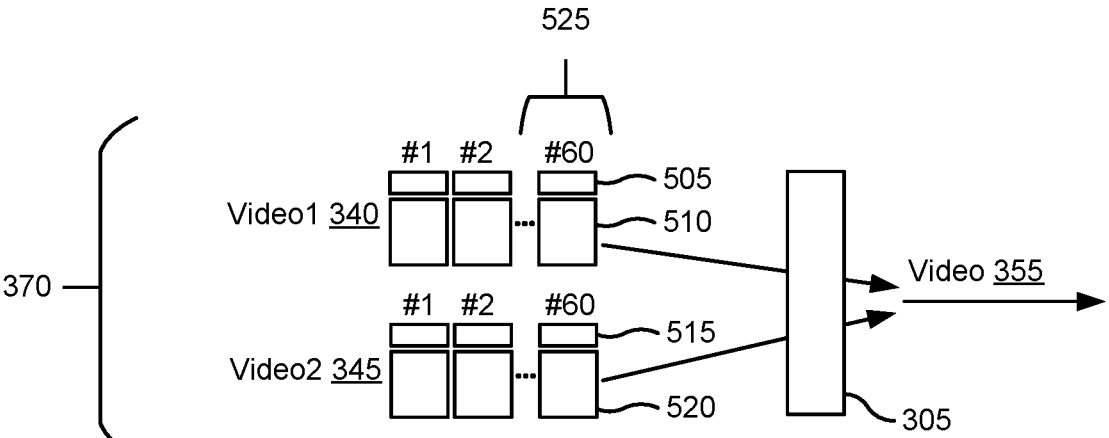
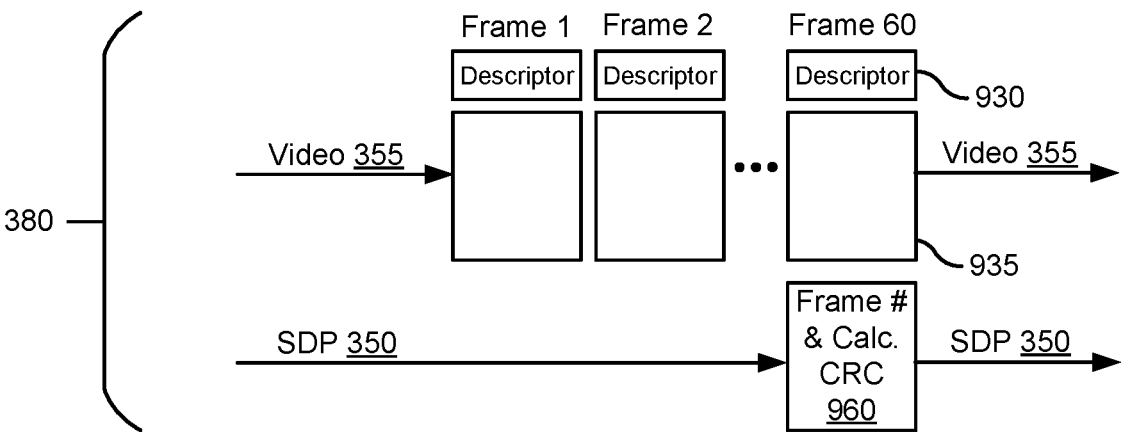
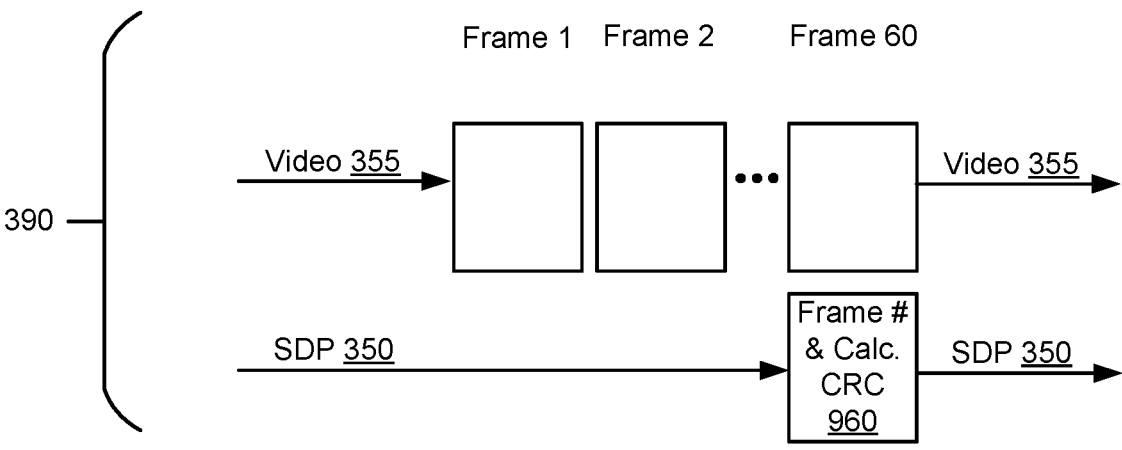
FIG. 9
900

1000

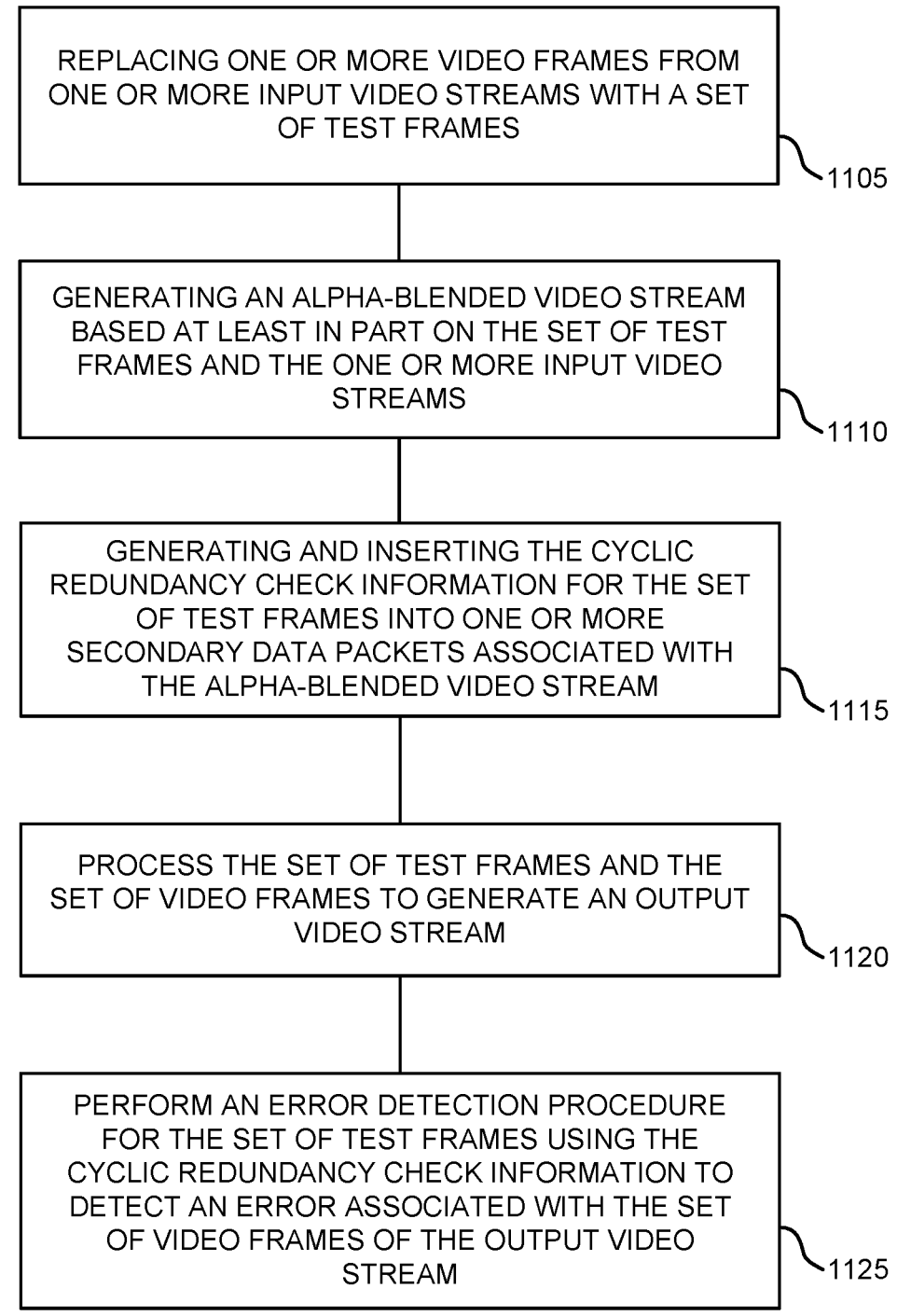

REPLACING ONE OR MORE VIDEO FRAMES FROM ONE OR MORE INPUT VIDEO STREAMS WITH A SET OF TEST FRAMES

1105

GENERATING AN ALPHA-BLENDED VIDEO STREAM BASED AT LEAST IN PART ON THE SET OF TEST FRAMES AND THE ONE OR MORE INPUT VIDEO STREAMS

1110

GENERATING AND INSERTING THE CYCLIC REDUNDANCY CHECK INFORMATION FOR THE SET OF TEST FRAMES INTO ONE OR MORE SECONDARY DATA PACKETS ASSOCIATED WITH THE ALPHA-BLENDED VIDEO STREAM

1115

PROCESS THE SET OF TEST FRAMES AND THE SET OF VIDEO FRAMES TO GENERATE AN OUTPUT VIDEO STREAM

1120

PERFORM AN ERROR DETECTION PROCEDURE FOR THE SET OF TEST FRAMES USING THE CYCLIC REDUNDANCY CHECK INFORMATION TO DETECT AN ERROR ASSOCIATED WITH THE SET OF VIDEO FRAMES OF THE OUTPUT VIDEO STREAM

END-TO-END SAFETY MECHANISM FOR DISPLAY SYSTEM

TECHNICAL FIELD

Examples of the present disclosure generally relate to display image data reliability and safety, for example end-to-end safety methods, apparatuses, and systems for display systems.

BACKGROUND

Modern automotive designs often incorporate display systems for various purposes, including for entertainment, control of automotive systems and functions, display of internal and/or external camera images, and display of warning messages. Increasingly, the automotive display systems display safety-critical information, which means that such display systems are subject to safety standards.

The Automotive Safety Integrity Level (ASIL) is a risk classification system by the ISO 26262 standard. ASIL has different levels of safety requirements, which are defined based on the probability of an occurrence of harm caused by an electrical system malfunction as a function of the severity of the harm caused by such malfunction. Typically, there is an inverse relationship between severity of harm and probability of harm, where the more probable, but less severe harms are associated with a same ASIL level as the less probable, but more severe harms. ASIL protection level proceed from least stringent at ASIL A, to ASIL B (associated a 90% fault coverage rate), to ASIL C, to the most stringent ASIL D (associated a 99% fault coverage rate). Stated another way, ASIL A, B, C, and D represent the lowest to highest safety requirements. A certain ASIL grade is typically required for communication between different electrical components, including for control units and peripherals, especially for enabling particular safety features such as automatic emergency break (AEB) systems, which may be a highest risk feature.

As an implementation in computer chips, significant resources may be needed to implement an ASIL level. As an example, it can take substantial research and development efforts (e.g., a re-spin of silicon) to add enough safety mechanisms for a commercial integrated circuit (IC) chip to achieve and be compliant with a particular ASIL grade (e.g., safety target ASIL B). Current approaches to modify IC chips to achieve an ASIL grade (e.g., ASIL B) for a display system include the incorporation of safety compliant intellectual property (IP) blocks (e.g., blocks for which the associated hardware are ASIL compliant), for example into existing IC chip designs for some or all the components in the display pipeline of the display system. As such, improved safety mechanisms for display systems, including automotive display systems, are desired.

SUMMARY

Some examples described herein provide for display image data reliability and safety, for example end-to-end safety methods, apparatuses, and systems for display systems.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of protecting display data in a display system. The method also includes replacing one or more video frames from one or more input video streams with a set of test frames. The method also includes generating an alpha-blended video stream based at least in part on the set of test frames and the one or more input video streams. The method also includes generating and inserting cyclic redundancy check information for the set of test frames into one or more secondary data packets associated with the alpha-blended video stream. The method also includes processing the set of test frames and the set of video frames by a display controller to generate an output video stream. The method also includes performing an error detection procedure for the set of test frames using the cyclic redundancy check information to detect an error associated with video frames of the output video stream. Other embodiments of this aspect include corresponding computer systems, apparatus, and computer programs recorded on one or more computer storage devices, each configured to perform the actions of the methods.

One general aspect includes a display system. The display system also includes a display receiving device may include a screen and a first display port coupled with the screen. The system also includes a display transmitting device may include a display controller and a second display port coupled with the display controller and the second display port, where the display system is configured to: replace one or more video frames from one or more input video streams with a set of test frames to generate an alpha-blended video stream, generate and insert cyclic redundancy check information for the set of test frames into one or more secondary data packets associated with the alpha-blended video stream, process the set of test frames and the set of video frames to generate an output video stream, and perform an error detection procedure for the set of test frames using the cyclic redundancy check information to detect an error associated with video frames of the output video stream. Other embodiments of this aspect include corresponding computer systems, apparatus, and computer programs recorded on one or more computer storage devices, each configured to perform the actions of the methods.

One general aspect includes an apparatus for a display transmitting device. The apparatus also includes a display port. The apparatus also includes a display controller coupled with the display port. The apparatus also includes a processor and a memory, where the memory stores instructions that when executed by the processor cause the apparatus to: generate cyclic redundancy check information for a set of test frames associated with an alpha-blended video stream; insert the cyclic redundancy check information into one or more secondary data packets associated with the alpha-blended video stream; process, by the display controller, the set of test frames and the set of video frames to generate an output video stream to be output from the display port; and perform an error detection procedure for the set of test frames using the cyclic redundancy check information to detect an error associated with video frames of the output video stream. Other embodiments of this aspect include corresponding computer systems, apparatus, and computer programs recorded on one or more computer storage devices, each configured to perform the actions of the methods.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 7 illustrates communication interface signals associated with communication interfaces of a display circuit, according to some examples.

FIG. 9 illustrates communication interface signals associated with communication interfaces of a display circuit, according to some examples.

FIG. 11 is flow diagram of a method for protecting display data in a display system according to some examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
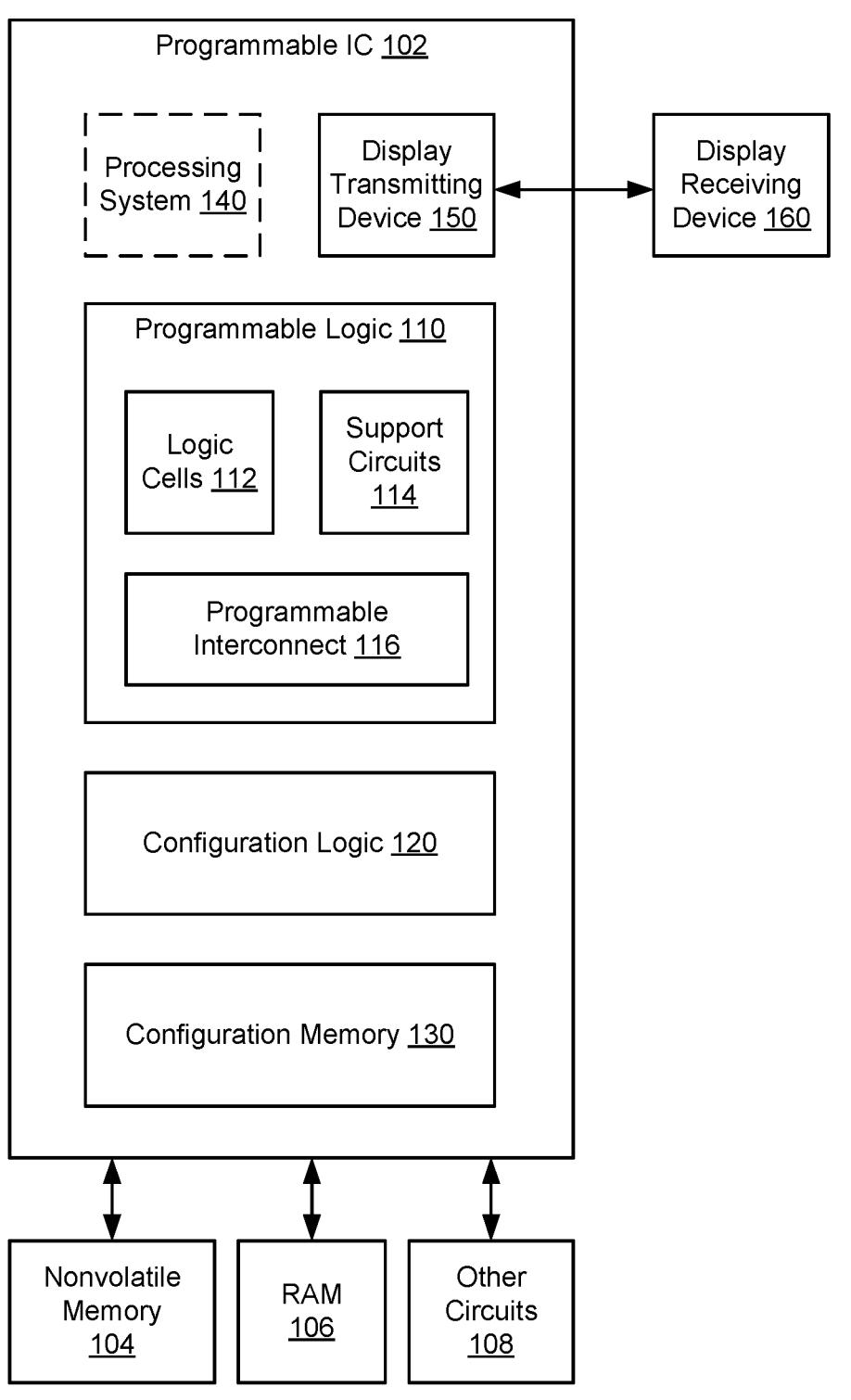
FIG. 1 is a block diagram depicting a computing system that includes a programmable integrated circuit (IC) according to an example.

Some examples described herein relate to display image data reliability and safety, for example end-to-end safety methods, apparatuses, and systems for display systems.

In one or more embodiments, a display system includes a display transmitting device and a display receiving device. The display transmitting device can include a display controller and a first display port. The display receiving device can include a second display port (e.g., that receives video streams and data packets from the first display port) and a display. In one or more embodiments, a method of protecting display data in the display system includes replacing one or more video frames from one or more input video streams with a set of test frames to generate an alpha-blended video stream. Cyclic redundancy check (CRC) information for the set of test frames is generated, then inserted into one or more secondary data packets associated with the alpha-blended video stream. The set of test frames and the set of video frames are then processed (e.g., by the display controller) to generate an output video stream, and an error detection procedure is performed for the set of test frames using the CRC information to detect an error associated with video frames of the output video stream. In some embodiments, the error detection procedure (e.g., CRC check) can be performed following the output of the display controller (e.g., prior to the first display port and in the display transmitting device). In other embodiments, the error detection procedure (e.g., CRC check) can be performed at the display receiving device following the output of the second display port (e.g., prior to the display).

In one or more embodiments, the test frames (test data) are included (inserted) periodically (e.g., one or more test frames in each one second, where each second includes, 60 frames, or 30 frames, or another quantity of frames per second depending on the video data format. The more frequently a test frame (test data) is inserted, the faster failures can typically be detected. However, an increased frequency of test frame insertion typically leads to performance loss.

In one or more embodiment, the test frame (test data) is inserted at the same time stamp (position) so that the blended (e.g., alpha blended) result is deterministic (known) so that the CRC of the blended test frame can be pre-calculated (pre-determined).

In one or more embodiments, the display controller (e.g., of a display transmitting device) blends multiple streams (e.g., N streams) into one stream. CRC is inserted for the one post-alpha-blended video output. Therefore, the receiving side (the display receiving device) can calculate the CRC based on the received video stream and see if the CRC matches the expected CRC.

In one or more embodiments, one or more of the test frame replacement, the test frame insertion, or the CRC insertion is done by software (e.g., firmware) running on safety certified processors. As such, the protection scheme described herein (e.g., the methods, apparatuses, and systems, for protecting display data) do not rely on the correctness of the display controller doing the insertion. As such, an advantage of the methods, apparatuses, and systems described herein is that the display controller itself does not need to be ASIL compliant.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1 is a block diagram depicting a computing system 100 that includes a programmable integrated circuit (IC) 102 according to an example. The programmable IC 102 includes programmable logic 110, configuration logic 120, and configuration memory 130. The programmable IC 102 can be coupled to external circuits, such as the nonvolatile memory (NVM) 104, the random access memory (RAM) 106, and other circuits 108. In some examples, RAM 106 may be dynamic random access memory (DRAM).

The programmable logic 110 includes logic cells 112, support circuits 114, and programmable interconnect 116. The logic cells 112 include circuits that can be configured to implement general logic functions of a plurality of inputs. The support circuits 114 include dedicated circuits, such as transceivers, input/output blocks, digital signal processors, memories, and the like. The logic cells 112 and the support circuits 114 can be interconnected using the programmable interconnect 116. Information for programming the logic cells 110, for setting parameters of the support circuits 114, and for programming the programmable interconnect 116 is stored in the configuration memory 130 by the configuration logic 120. The configuration logic 120 can obtain the configuration data from the nonvolatile memory 104 or any other source (e.g., the RAM 106 or from the other circuits 108).

In some examples, the programmable IC 102 is a part of a computing system and is communicatively coupled with a processing system (not shown) of the computing system that is external to the programmable IC 102. The external processing system can include microprocessor(s), memory, support circuits, input/output (I/O) circuits, and the like. In other examples, the processing system 140 can be used in place of at least some of the external processing system for the computing system. The programmable IC 102 can be part of the computing system, and the programmable IC 102 can include the processing system 140 as part of the programmable IC 102, such that the programmable IC 102 includes one or more of the microprocessor(s), memory, support circuits, I/O circuits, and the like. In some example, the entire computing system can be implemented using the programmable IC programmable IC 102.

In one or more examples, the programmable IC 102 includes a display transmitting device 150, that implements one or more features further described herein. The display transmitting device 150 is coupled with a with a display receiving device 160. The display transmitting device 150 can include a display controller (not shown) and display port (not shown) to communicatively couple the display transmitting device 150 to the display receiving device 160. The display receiving device 160, which may also be or be referred to as a display in some examples, includes a screen (not shown) and a display port (not shown), the display port of the display receiving device 160 coupled with the display port of the display transmitting device 150.

In one or more examples, one or more circuits of the computing system 100 generates cyclic redundancy check (CRC) information for a set of test frames associated with one or more input video streams (e.g., primary data packets). The one or more circuits also insert the CRC information into one or more secondary data packets (SDPs) associated with the one or more input video streams. The one or more circuits (e.g., the display controller of the display transmitting device 150) also process the set of test frames and the set of video frames to generate an output video stream. The one or more circuits also perform an error detection procedure for the set of test frames using the CRC information to detect an error associated with the set of video frames of the output video stream.

Figure 2:
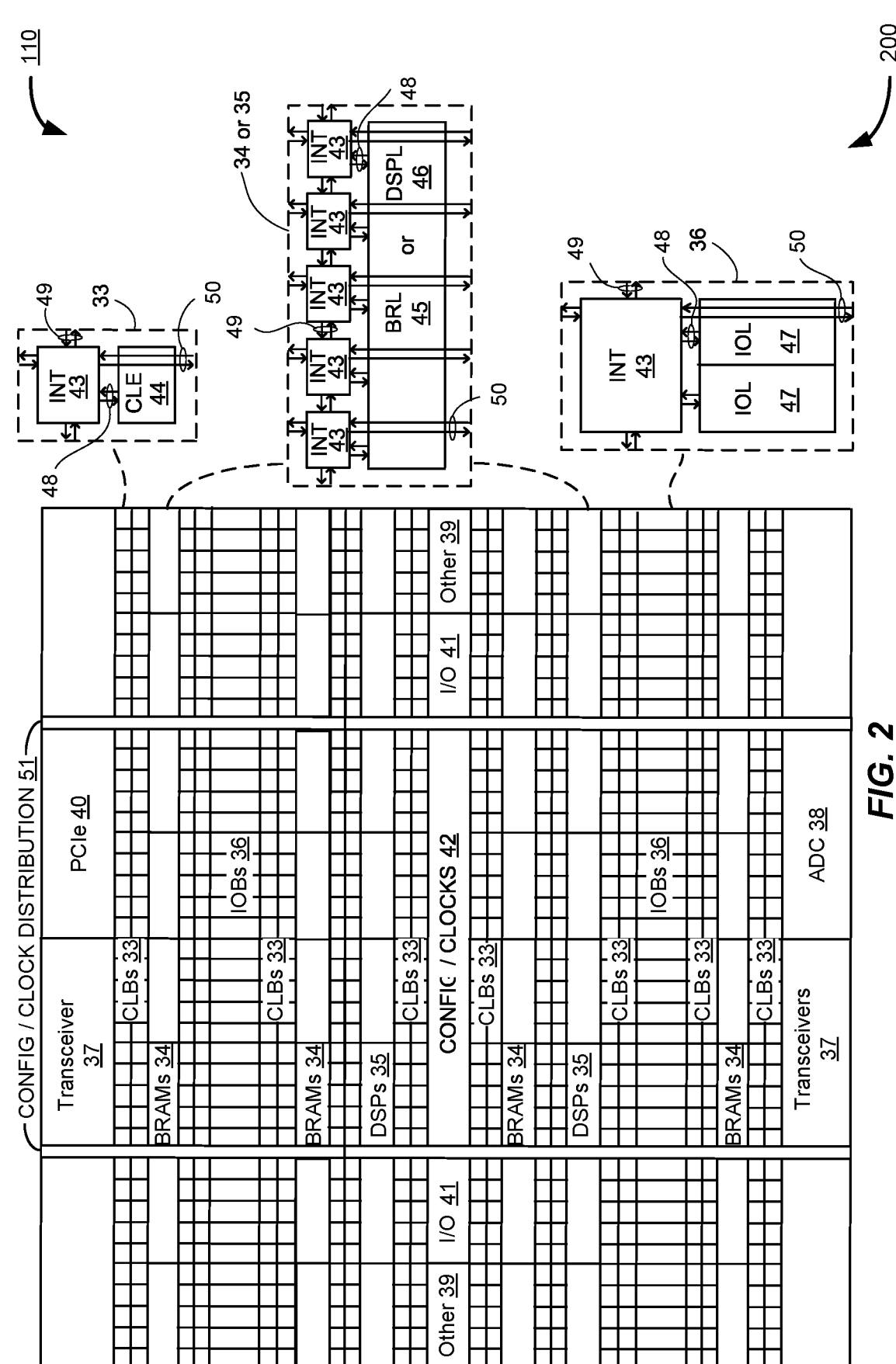
FIG. 2 illustrates a field programmable gate array (FPGA) implementation of the programmable IC according to some examples.

FIG. 2 illustrates a field programmable gate array (FPGA) implementation 200 of the programmable IC 102 according to some examples. In one or more examples, the programmable IC 102 that includes a large number of different programmable tiles including transceivers 237, configurable logic blocks (CLBs) 233, block random access memories (BRAMs) 234, input/output blocks ("IOBs") 236, configuration and clocking logic ("CONFIG/CLOCKS") 242, digital signal processor (DSP) blocks 235, specialized input/output blocks ("I/O") 241 (e.g., configuration ports and clock ports), and other programmable logic 239 such as digital clock managers, analog-to-digital converters, system monitoring logic, and so forth. The FPGA can also include peripheral component interconnect (PCI) express (PCIe) interfaces 240, analog-to-digital converters (ADCs) 238, and the like.

In some FPGAs, each programmable tile can include at least one programmable interconnect element ("INT") 243 having connections to input and output terminals 248 of a programmable logic element within the same tile, as shown by examples included at the top of FIG. 2. Each programmable interconnect element 243 can also include connections to interconnect segments 249 of adjacent programmable interconnect element(s) in the same tile or other tile(s). Each programmable interconnect element 243 can also include connections to interconnect segments 250 of general routing resources between logic blocks (not shown). The general routing resources can include routing channels between logic blocks (not shown) comprising tracks of interconnect segments (e.g., interconnect segments 250) and switch blocks (not shown) for connecting interconnect segments. The interconnect segments of the general routing resources (e.g., interconnect segments 250) can span one or more logic blocks. The programmable interconnect elements 243 taken together with the general routing resources implement a programmable interconnect structure ("programmable interconnect") for the illustrated FPGA.

In an example implementation, a CLB 233 can include a configurable logic element ("CLE") 244 that can be programmed to implement user logic plus a single INT 243. A BRAM 234 can include a BRAM logic element ("BRL") 245 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 235 can include a DSP logic element ("DSPL") 246 in addition to an appropriate number of programmable interconnect elements. An IOB 236 can include, for example, two instances of an input/output logic element ("IOL") 247 in addition to one instance of the programmable interconnect element 243. As will be clear to those of skill in the art, the actual I/O pads connected, for example, to the I/O logic element 247 typically are not confined to the area of the input/output logic element 247.

In the pictured example of the FPGA implementation 200, a horizontal area near the center of the die is used for configuration, clock, and other control logic. Vertical columns 251 extending from this horizontal area or column are used to distribute the clocks and configuration signals across the breadth of the FPGA implementation 200.

Some examples of FPGAs utilizing the architecture illustrated by the FPGA implementation 200 include additional logic blocks that disrupt the regular columnar structure of the FPGA implementation 200. The additional logic blocks can be programmable blocks and/or dedicated logic.

Note that the FPGA implementation 200 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of the illustrated FPGA implementation 200 are purely exemplary. For example, in an actual implementation of an FPGA, more than one adjacent row of CLBs is typically included where the CLBs appear, to facilitate the efficient implementation of user logic, but the number of adjacent CLB rows can vary with the overall size of the FPGA.

Figures 3, 4:
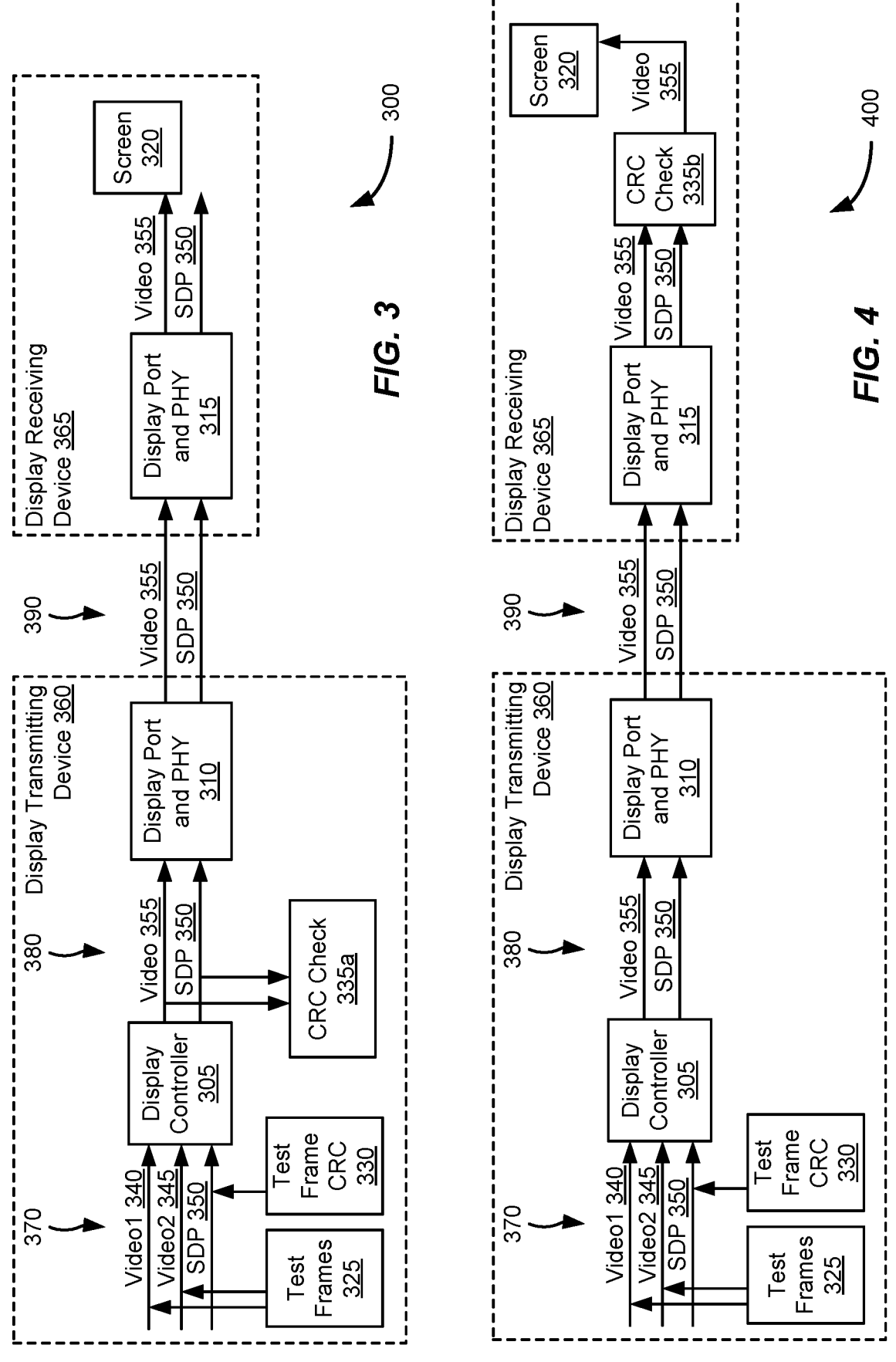
FIG. 3 illustrates a display circuit of a display system for display image data reliability and safety, according to some examples.
FIG. 4 illustrates a display circuit of a display system for display image data reliability and safety, according to some examples.

FIG. 3 illustrates a display circuit 300 of a display system for display image data reliability and safety, according to some examples.

In one or more embodiments, display circuit 300 includes a display transmitting device 360 and a display receiving device 365. The display receiving device 365 includes a screen 320 and a first display port, the display port and PHY 315, which may include a PHY layer processing capability for a communications interface 390 between the display transmitting device 360 and the display receiving device 365. The display transmitting device 360 includes a display controller 305 and a second display port and PHY 310, which may include a PHY layer processing capability for the communications interface 390.

The display controller can receive one or more video streams at an input interface 370 of the display controller 305, for example a first input video stream 340 and a second input video stream 345. In other embodiments a different number (e.g., a single video stream, or three or more video streams) of video streams may be input to the display controller 305 via the input interface 345. Video frames for the video streams (e.g., a first set of video frames of first input video stream 340, a second set of video frames of the second input video stream 345, or both), can be read (pulled) from a memory (e.g., double data rate (DDR) random access memory (RAM)). In one or more embodiments, the memory is an example of RAM 106.

According to the techniques described herein, test frames 325 are identified for the video streams (one or more input video streams), including for the first input video stream 340, the second input video stream 345, or a combination thereof. Test frame CRC information 330 is then generated based on the test frames (i.e., for a set of test frames associated with one or more input video streams), and the test frame CRC information 330 is inserted into one or more secondary data packets (SPDs) 350 associated with the input video stream.

The display controller 305 can process the one or more input video streams (e.g., first input video stream 340; second input video stream 345) to generate an video stream 355 that comprises video information (e.g., video information bits, video data) from the one or more one or more input video streams, as well as the SDP 350. In one or more embodiments, the display controller 305 can modify at least a portion of the SDP 350, but leave the test frame CRC information 330 unmodified, for example by adding, deleting, or modifying packet header information or control information or fields different from the test frame CRC information 330. In some embodiments, the display controller 305 does not modify the payload of the SDP 350, including the test frame CRC information 330. Display controller outputs the video stream 355 and the SDP 350 to the display port and PHY 310 via the communication interface 380.

The display transmitting device 360 can perform a CRC check 335a for the test frames using test frame CRC information 330 from the SDP 350. In some embodiments, the CRC information can be generated using a fixed-size checksum for the test frames 325, and the CRC check 335a performs the same CRC calculation on the for the test frames obtained via video stream 355 (the test frames being the block of data) and compares the result with the checksum from the SDP 350. If the checksums match, the test frames were likely transmitted without errors through the display controller 305. However, if the checksums differ, the difference indicates that the presence of errors in the test frames.

The display port and PHY 310 transmits the video stream 355 and the SDP 350 from the display transmitting device 360 via communication interface 390 to the display port and PHY 315 of the display receiving device 365. Video stream 355 then passes to the screen 320, which can be any suitable screen (display).

According to one or more embodiments, display circuit 300 includes a display pipeline where the display controller 305 is protected, including via the use of CRC for the set of test frames 325. In one or more embodiments, display controller 305 can be a standard commercial intellectual property (IP) block or FPGA implementation (or other programmable logic implementation) (e.g., using at least portions of programmable logic 110 or FPGA implementation 200), or otherwise non-ASIL protection specific, which can decrease the time and cost associated with developing a display controller 305 that is specifically ASIL-compliant.

In some embodiment, features and functions associated with generating test frames 325 and test frame CRC information 330, or performing a CRC check 335a, or both, can be performed using firmware. In some embodiments, firmware includes instructions stored in memory of or coupled with the display circuit 300 that are executed by one or more processors of or associated with the display circuit 300 (e.g., a processor collocated on an integrated circuit chip or chip assembly with the display transmitting device 360).

FIG. 4 illustrates a display circuit 400 of a display system for display image data reliability and safety, according to some examples.

Display circuit 400 includes similar components as described for display circuit 300. However, for display circuit 400, the display receiving device 365 can perform a CRC check 335b for the test frames using test frame CRC information 330 from the SDP 350, wherein the video stream 355 and SDP 350 are communicated through display controller 305, display port and PHY 310 (a second display port), and display port and PHY 315 (a first display port), prior to the CRC check 335 being performed prior to display on screen 320.

According to one or more embodiments, display circuit 400 includes a display pipeline where the display controller 305, display port and PHY 310 (the second display port), display port and PHY 315 (the first display port), and associated communication interfaces, communication interface 380 and communication interface 390 are protected, including via the use of CRC for the set of test frames 325. In one or more embodiments, display controller 305, display port and PHY 310, and display port and PHY 315 can be standard commercial IP blocks, or otherwise non-ASIL protection specific, which can decrease the time and cost associated with developing a display controller 305, display port and PHY 310, and display port and PHY 315 that are specifically ASIL-compliant.

In some embodiment, features or functions associated with generating test frames 325 and test frame CRC information 330, or performing a CRC check 335b, or both, can be performed using firmware. In some embodiments, the firmware includes instructions stored in memory of or coupled with the display circuit 300 that are executed by one or more processors of or associated with the display circuit 300 (e.g., a processor collocated on an integrated circuit chip or chip assembly with the display transmitting device 360). In some embodiments, one or more features or functions associated with performing the CRC check 335b can use hardware circuits (e.g., alone or together with firmware or other code) in addition to the display port and PHY 315 and screen 320 of the display receiving device 365.

In one or more embodiments, the CRC check 335 (e.g., CRC check 335a, or CRC check 335b) can be performed at a different portion of the display pipeline to protect other or additional components in the display pipeline without adding specialized ASIL-compliant IP blocks to those components. In some embodiments, a CRC check 335 can be performed at multiple points (e.g., multiple communication interfaces).

Figure 5:
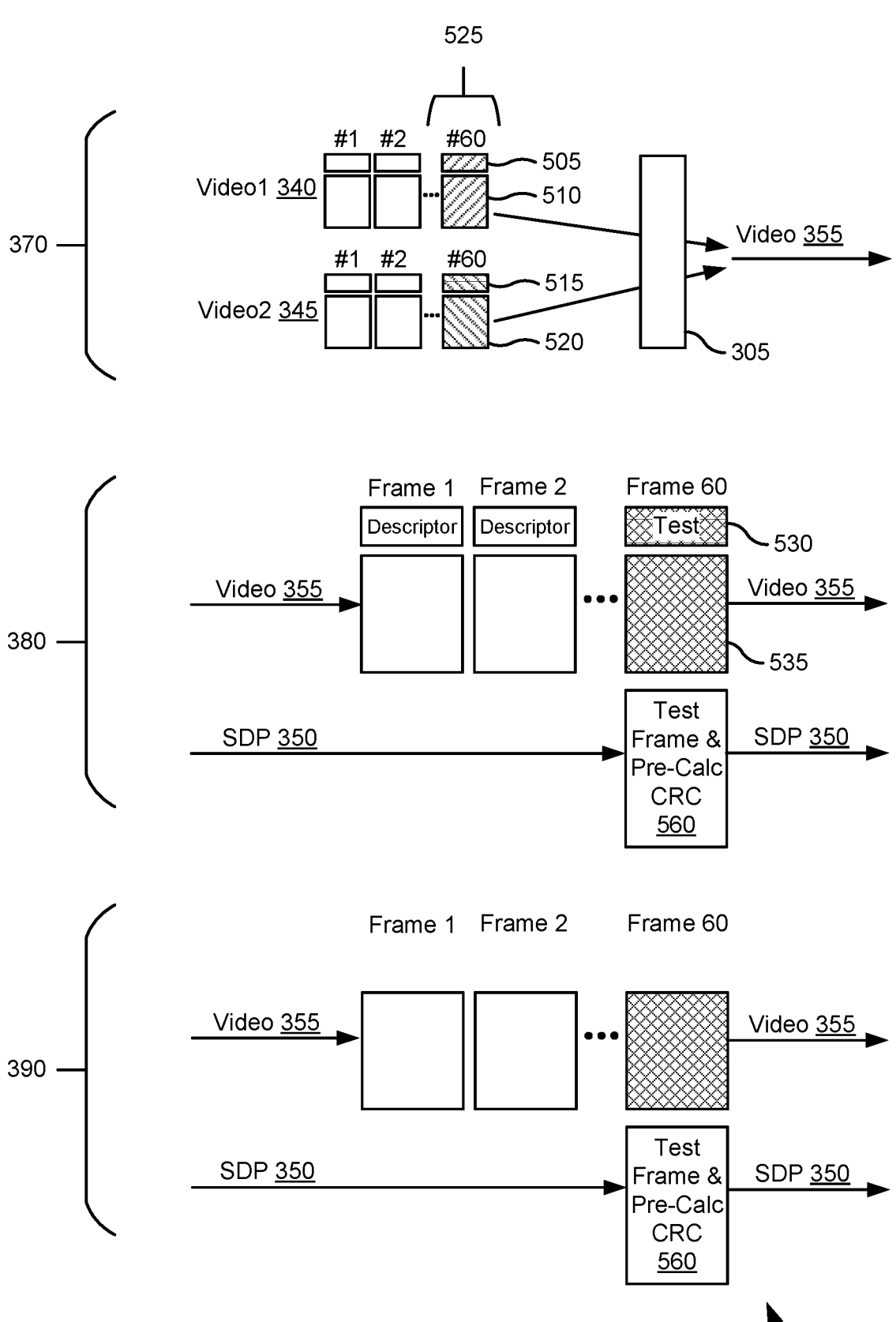
FIG. 5 illustrates communication interface signals associated with communication interfaces of a display circuit, according to some examples.

FIG. 5 illustrates communication interface signals 500 associated with communication interfaces of a display circuit, according to some examples. Communication interface signals 500 include signals at input interface 370 (which may be referred to as a communication interface) (inputs to the display controller 305), signals at communication interface 380 (outputs of the display controller 305 and inputs to the display port and PHY 310), and signals at communication interface 390 (outputs of the display port and PHY 310).

In one or more embodiments, signals at input interface 370 include at least a first input video stream 340 (which may also be or be referred to as just a video stream or first video stream) and a second input video stream 345 (which may also be or be referred to as a video stream or second video stream). A set of test frames 525 can then be identified (e.g., by firmware, as further discussed herein) from the first input video stream 340. Each test frame from of the set of test frames 525 may be associated with one or more video frames per second (e.g., the $60^{th}$ video frame, the last frame, among a set of video frame comprising 60 frames per second). A $60^{th}$ video frame of the first input video stream 340 can include video data 510 and an associated descriptor 505 for the video data 510, the associated descriptor 505 indicating that the corresponding video data 510 is of a test frame.

In some embodiment, there can be more than one input video stream, for example a second input video stream 345 in addition to the first input video stream 340. According to this embodiment, the set of test frames 525 is identified (e.g., by firmware, as further discussed herein) from the first input video stream 540 and the second input video stream 545. Each test frame from of the set of test frames 525 can be associated with one or more video frames per second (e.g., the $60^{th}$ video frame, the last frame, among a set of video frame comprising 60 frames per second). A $60^{th}$ video frame of the first input video stream 540 can include video data 510 and an associated descriptor 505 for the video data 510, and a $60^{th}$ video frame of the second input video stream 545 can include video data 520 and an associated descriptor 515 for the video data 520. Each of descriptor 505 and descriptor 515 indicating that the corresponding video data 510 and video data 520, respectively, is of a test frame. The video frames of the first input video stream 540 and the second input video stream 545 are then processed by the display controller 305 to generate a video stream 355.

In one or more embodiments, signals at communication interface 380 include the video stream 355, which includes a set of video frames, including a test frame that includes video data 535 and an associated descriptor 530 that indicates that the video data 535 is for a test frame. SDP 350 is carried through the display controller 305 and continues at communication interface 380. SDP 350 includes an indication of the test frame and a pre-calculated CRC, test frame CRC 560. Here, because a known test frame was inserted into the first input video stream 340 (and also a known test frame into the second input video stream 345, if applicable), the corresponding CRC may be precalculated and an indication of the precalculated CRC inserted into SDP 350. In one or more embodiments, the CRC of SDP 350 is a pre-calculated-blended (alpha-blended) CRC for the test frame.

In some embodiments, for example with reference to display circuit 300, a CRC check 335 is performed on the set of test frames for the set of video frames at communication interface 380. In one or more embodiments, for example with reference to display circuit 400, a CRC check 335 may be performed on the set of test frames for the set of video frames at communication interface 380. The CRC check 335 (e.g., circuits and/or firmware implementing CRC check 335) can pass regular data (e.g., regular, non-test video frames), compute a frame CRC for a test frame and check with the CRC information (e.g., golden information) in the SDP 350. In other embodiments, for example with reference to display circuit 400, a CRC check 335 is performed on the set of test frames for the set of video frames at display receiving device 365. In one or more embodiments, following the CRC check 335 (e.g., CRC check 335a, or CRC check 335b), the test frame(s) is discarded, an error signal is sent if CRC check 335 does not pass, and the discarded test frame(s) are replaced with other data if needed (e.g. a previous pixel or frame).

In one or more embodiments, signals at communication interface 390 include the video stream 355, which includes a set of video frames, including a test frame that includes video data 535. In one or more embodiments a CRC check 335a is performed prior to the passage of the video stream 355 through the display port and PHY 310, and the associated descriptor 530 for the test frame (or test frames) is removed.

Figure 6:
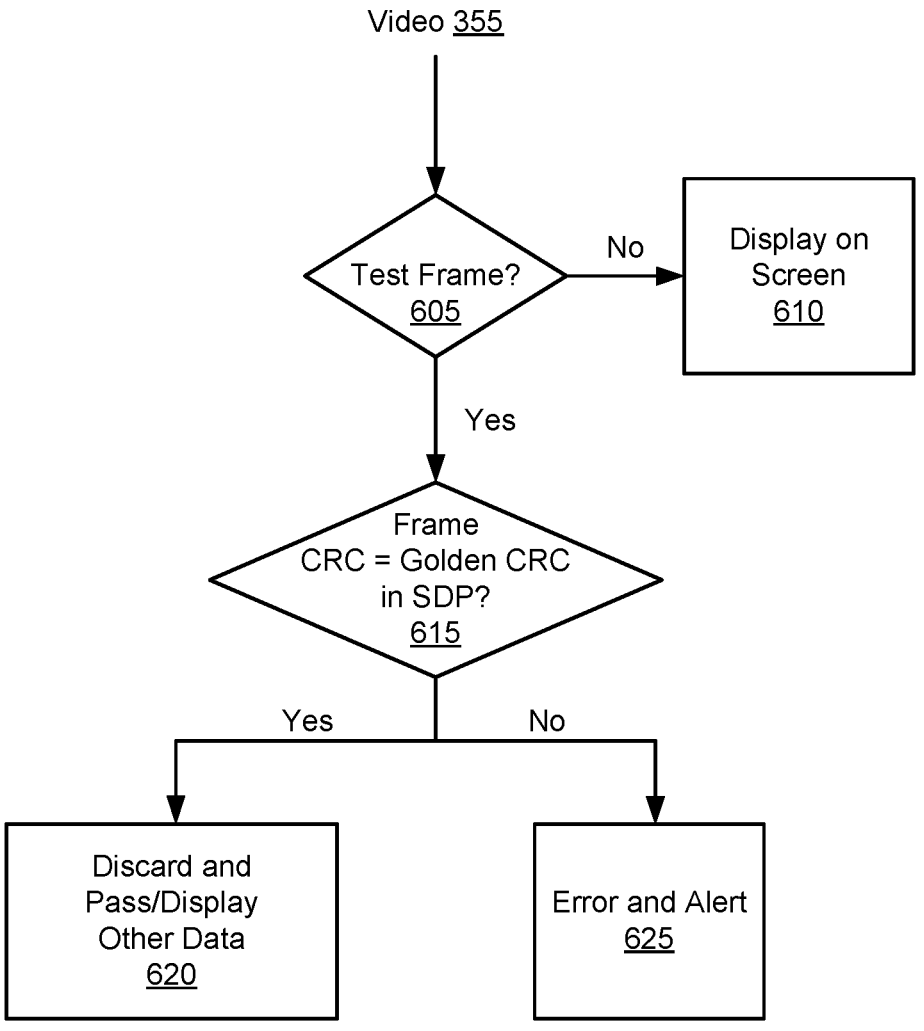
FIG. 6 illustrates process for display image data reliability and safety, according to some examples.

FIG. 6 illustrates process 600 for display image data reliability and safety, according to some examples. In one or more embodiments, process 600 illustrates one or more aspects that can be performed according to or using one or more circuits of computing system 110, FPGA implementation 200, display circuit 300, display circuit 400, or communication interface signals 500, according to some examples.

Process 600 includes receiving a video stream 355 that includes video frames. At 605, if the video frame is not indicated as or is not a test frame, then the video frame is displayed on a screen (e.g., screen 320) at 610. If the video frame is indicated as or is a test frame, then process 600 proceeds to 615. At 615, a CRC (e.g., CRC value, CRC information) is calculated for the test frame and compared (e.g., using an XOR operation) to a golden CRC value. In one or more embodiments, the CRC is associated with the test frame (e.g., CRC information conveyed by SDP 350, for example the test frame CRC 560).

If the CRC values match at 615 (e.g., are the same or otherwise acceptable), then at 620, the test frame is discarded or otherwise ignored, and other data is displayed or passed instead. In one or more embodiments, the other data is passed to another circuit or block of the display pipeline, for example where a CRC check is performed according to display circuit 300 (e.g., following the CRC check 335a). In one or more embodiments, the other data is displayed according to the display pipeline, for example where a CRC check is performed according to display circuit 400 (e.g., following the CRC check 335b).

In one or more embodiments, the other data is a previous video frame (e.g., for 60 frames per second operation, the test frame can be the $60^{th}$ frame, and the previous video frame is the $59^{th}$ video frame). In one or more embodiments, the other data is a different set of values or data, such as a combination or blend of one or more previous frames, subsequent frames, or a combination thereof.

If the CRC values do not match at 615 (e.g., there are one or more differences in the CRC values, or the CRC data is corrupted or otherwise unacceptable, unusable or with error), then at 625, an error is triggered and communicated (e.g., to the display controller, or other processor, controller, or circuitry), the test frame is discarded and other data is displayed, for example as described above.

FIG. 7 illustrates communication interface signals 700 associated with communication interfaces of a display circuit, according to some examples. Communication interface signals 700 include signals at input interface 370 (which may be referred to as a communication interface), signals at communication interface 380, and signals at communication interface 390.

In one or more embodiments, signals at input interface 370 include at least a first input video stream 340 (which may also be or be referred to as just a video stream or first video stream) and a second input video stream 345 (which may also be or be referred to as a video stream or second video stream). A set of test frames 725 can then be identified (e.g., by firmware, as further discussed herein) from the first input video stream 340. Each test frame from of the set of test frames 725 may be associated with all or a subset of one or more video frames per second (e.g., each video frame of 60 frames per second, half the 60 frames per second (alternating or the first half, or the last half), just the $60^{th}$ video frame, the last frame, the first, or the $30^{th}$, and so on, among a set of video frame comprising 60 frames per second, the $30^{th}$, first, last, or other video frame among 30 frames per second, etc.). The set of identified test frame or frames of the first input video stream 340 can include video data 510 and an associated descriptor 505 for the video data 510, the associated descriptor 505 indicating that the corresponding video data 510 is of a test frame.

In some embodiment, there can be more than one input video stream, for example a second input video stream 345 in addition to the first input video stream 340, as further described above with reference to communication interface signals 500. The second input video stream 345 may also include one or more test frames, structured or otherwise configured the same as or similar to the one or more test frames of the first input video stream 340.

The identified test frames of the first input video stream 340, the second input video stream 345, or a combination thereof, includes test data that is inserted into the test frames. In one or more embodiments, the video frames of the input video stream or streams are unchanged other than with respect to the test data that is inserted. In some embodiments, the inserted test data is inserted into a set of one or more columns of the video frame. In some embodiments, the inserted test data is inserted into a set of one or more rows of the video frame. In some embodiments, the inserted test data is inserted into a set of combinations of one or more row and one or more columns of the video frame. In one or more embodiments, the insertion of the test data is performed following (e.g., immediately following) fetch of the video frame from memory (e.g., from a DRAM, such as a DDR DRAM).

In one or more embodiments, signals at communication interface 380 include the video stream 355, which includes a set of video frames, including the test frames that includes video data 535 and an associated descriptor 530 that indicates that the video data 535 is for a test frame. SDP 350 is carried through the display controller 305 and continues at communication interface 380. SDP 350 includes an indication of the test frame and a pre-calculated CRC, the row and column CRC 760. Here, because the test data that was inserted into the first input video stream 340 is known (and also known test data into the second input video stream 345, if applicable), the corresponding CRC may be precalculated and an indication of the precalculated CRC inserted into SDP 350. In one or more embodiments, the CRC of SDP 350 is a pre-calculated-blended (alpha-blended) CRC for each of the test frames. In one or more embodiments, the CRC that is calculated, determine, or otherwise identified for the test frames is based on the inserted test data, and exclusive of other information or data of the video frames outside of the test data portions of the video frames.

In some embodiments, for example with reference to display circuit 300, a CRC check 335 is performed on the set of test frames for the set of video frames at communication interface 380. In one or more embodiments, for example with reference to display circuit 400, a CRC check 335 may be performed on the set of test frames (e.g., on the same portions (one or more rows, one or more columns, or a combination thereof) of the video frames that include the test data) for the set of video frames at communication interface 380. The CRC check 335 (e.g., circuits and/or firmware implementing CRC check 335) can pass regular data (e.g., regular, non-test video frames), compute a frame CRC for a test frame and check with the CRC information (e.g., golden information) in the SDP 350. In other embodiments, for example with reference to display circuit 400, a CRC check 335 is performed on the set of test frames for the set of video frames at display receiving device 365. In one or more embodiments, following the CRC check 335 (e.g., CRC check 335a, or CRC check 335b), the test data of the set of test frames is discarded, an error signal is sent if CRC check 335 does not pass, and the discarded test data of the test frames is replaced with other data if needed (e.g. a different portion (row, column, or both) of the current video frame or pixel, a prior video frame or pixel, or a subsequent video frame or pixel).

In one or more embodiments, signals at communication interface 390 include the video stream 355, which includes a set of video frames, including a test frame that includes video data 535. In one or more embodiments a CRC check 335a is performed prior to the passage of the video stream 355 through the display port and PHY 310, and the associated descriptor 530 for the test frame (or test frames) is removed.

Figure 8:
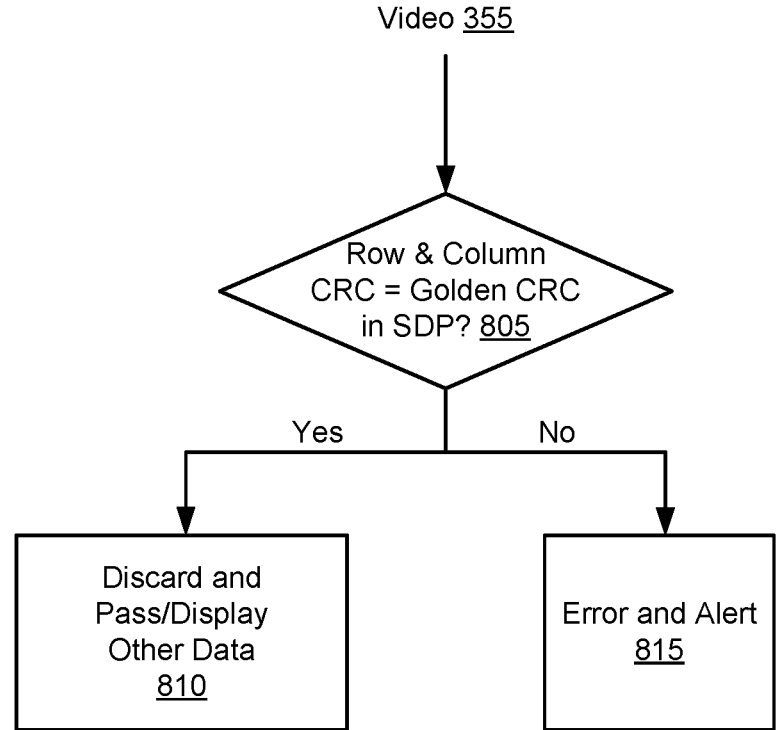
FIG. 8 illustrates process for display image data reliability and safety, according to some examples.

FIG. 8 illustrates process 800 for display image data reliability and safety, according to some examples. In one or more embodiments, process 600 illustrates one or more aspects that can be performed according to or using one or more circuits of computing system 110, FPGA implementation 200, display circuit 300, display circuit 400, or communication interface signals 700, according to some examples.

Process 800 includes receiving a video stream 355 that includes video frames. At 805, a CRC (e.g., CRC value, CRC information) is calculated for the test data portions of the test frame or frames, then compared (e.g., using an XOR operation) to a golden CRC value. In one or more embodiments, the CRC is associated with the test frame (e.g., CRC information conveyed by SDP 350, for example row and column CRC 760).

If the CRC values match at 805 (e.g., are the same or otherwise acceptable), then at 810, the test data of the test frame is discarded or otherwise ignored, and other data is displayed or passed instead. In one or more embodiments, the other data is passed to another circuit or block of the display pipeline, for example where a CRC check is performed according to display circuit 300 (e.g., following the CRC check 335*a*). In one or more embodiments, the other data is displayed according to the display pipeline, for example where a CRC check is performed according to display circuit 400 (e.g., following the CRC check 335*b*).

In one or more embodiments, the other data is one or more rows, columns, or both, of one or more previous, current, or subsequent video frames. In one or more embodiments, the other data is a different set of values or data, such as a combination or blend of one or more previous frames, subsequent frames, or a combination thereof.

If the CRC values do not match at 805 (e.g., there are one or more differences in the CRC values, or the CRC data is corrupted or otherwise unacceptable, unusable or with error), then at 815, an error is triggered and communicated (e.g., to the display controller, or other processor, controller, or circuitry), the test frame is discarded and other data is displayed, for example as described above.

FIG. 9 illustrates communication interface signals 900 associated with communication interfaces of a display circuit, according to some examples. Communication interface signals 900 include signals at input interface 370 (which may be referred to as a communication interface), signals at communication interface 380, and signals at communication interface 390.

In one or more embodiments, signals at input interface 370 include at least a first input video stream 340 (which may also be or be referred to as just a video stream or first video stream) and a second input video stream 345 (which may also be or be referred to as a video stream or second video stream). A set of test frames 725 can then be identified (e.g., by firmware, as further discussed herein) from the first input video stream 340. Each test frame from of the set of test frames 725 may be associated with all or a subset of one or more video frames per second (e.g., each video frame of 60 frames per second, half the 60 frames per second (alternating or the first half, or the last half), just the $60^{th}$ video frame, the last frame, the first, or the $30^{th}$, and so on, among a set of video frame comprising 60 frames per second, the $30^{th}$, first, last, or other video frame among 30 frames per second, etc.). The set of identified test frame or frames of the first input video stream 340 can include video data 510 and an associated descriptor 505 for the video data 510, the associated descriptor 505 indicating that the corresponding video data 510 is of a test frame.

In some embodiment, there can be more than one input video stream, for example a second input video stream 345 in addition to the first input video stream 340, as further described above with reference to communication interface signals 500. The second input video stream 345 may also include one or more test frames, structured or otherwise configured the same as or similar to the one or more test frames of the first input video stream 340.

In one or more embodiments, the identified test frames of the first input video stream 340, the second input video stream 345, or a combination thereof, are unchanged following fetch of the video frame from memory (e.g., from a DRAM, such as a DDR DRAM).

In one or more embodiments, signals at communication interface 380 include the video stream 355, which includes a set of video frames, including the test frames that includes video data 935 and an associated descriptor 930 that indicates that the video data 935 is a test frame. SDP 350 is carried through the display controller 305 and continues at communication interface 380. SDP 350 includes an indication of the test frame (e.g., the test frame previously identified for which the CRC is calculated) and a CRC 960 for the test frame. In one or more embodiments, the CRC of SDP 350 is calculated using a blending technique (e.g., alpha-blending) for each of the test frames of test frames 525.

In some embodiments, for example with reference to display circuit 300, a CRC check 335 is performed on the set of test frames at communication interface 380. In one or more embodiments, for example with reference to display circuit 400, a CRC check 335 may be performed on the set of test frames at communication interface 380. The CRC check 335 (e.g., circuits and/or firmware implementing CRC check 335) can pass regular data (e.g., regular, non-test video frames), compute a frame CRC for a test frame and check with the CRC information (e.g., golden information) in the SDP 350. In other embodiments, for example with reference to display circuit 400, a CRC check 335 is performed on the set of test frames for the set of video frames at display receiving device 365. In one or more embodiments, following the CRC check 335 (e.g., CRC check 335*a*, or CRC check 335*b*), the set of test frames are discarded, an error signal is sent if CRC check 335 does not pass, and the discarded test frames are replaced with other data if needed, for example a prior video frame or pixel, or a subsequent video frame or pixel.

In one or more embodiments, signals at communication interface 390 include the video stream 355, which includes a set of video frames, including a test frame that includes video data 535. In one or more embodiments a CRC check 335*a* is performed prior to the passage of the video stream 355 through the display port and PHY 310, and the associated descriptor 565 for the test frame (or test frames) is removed.

Figure 10:
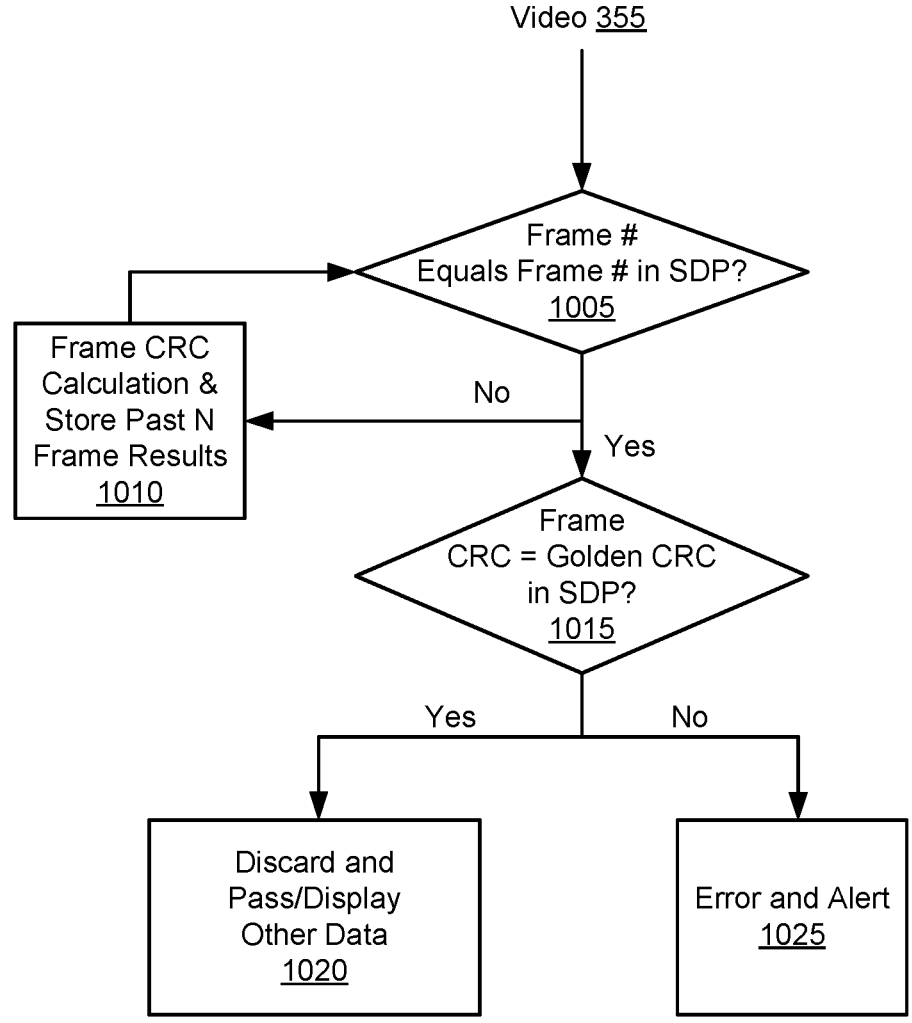
FIG. 10 illustrates process for display image data reliability and safety, according to some examples.

FIG. 10 illustrates process 1000 for display image data reliability and safety, according to some examples. In one or more embodiments, process 1000 illustrates one or more aspects that can be performed according to or using one or more circuits of computing system 110, FPGA implementation 200, display circuit 300, display circuit 400, or communication interface signals 900, according to some examples.

Process 1000 includes receiving a video stream 355 that includes video frames. At 1005, the frame number of the test frame is compared to the frame number of the CRC information in the SDP 350 (e.g., frame number and calculated CRC 960 conveyed by SDP 350). If the frame number is different, for example because the test frame precedes or follows the reception and interpretation (reading) of the SDP 350, the CRC for the test frame is calculated and stored at 1010. In one or more embodiments a threshold (e.g., a configurable, preconfigured) number (N) of calculated CRC values are stored. When the frame number of the CRC of SDP 350 equals (matches, is the same as) the frame number of the test frame, the CRCs are compared at 1015.

If the CRC values match at 1015 (e.g., are the same or otherwise acceptable), then at 1020, the test frame is discarded or otherwise ignored, and other data is displayed or passed instead. In one or more embodiments, the other data is passed to another circuit or block of the display pipeline, for example where a CRC check is performed according to display circuit 300 (e.g., following the CRC check 335*a*). In one or more embodiments, the other data is displayed according to the display pipeline, for example where a CRC check is performed according to display circuit 400 (e.g., following the CRC check 335*b*).

If the CRC values do not match at 1015 (e.g., there are one or more differences in the CRC values, or the CRC data is corrupted or otherwise unacceptable, unusable or with error), then at 1025, an error is triggered and communicated (e.g., to the display controller, or other processor, controller, or circuitry), the test frame is discarded and other data is displayed, for example as described above.

FIG. 11 is flow diagram of a method 1100 for protecting display data in a display system according to some examples.

At operation 1105, the method includes replacing one or more video frames from one or more input video streams with a set of test frames.

At operation 1110, the method includes generating an alpha-blended video stream based at least in part on the set of test frames and the one or more input video streams. The alpha-blended video stream having alpha-blended test frames based on pixels from the set of test frames and the one or more input video streams.

At operation 1115, the method includes generating and inserting cyclic redundancy check information for the set of test frames into one or more secondary data packets associated with the alpha-blended video stream.

At operation 1120, the method includes processing the set of test frames and the set of video frames by a display controller to generate an output video stream.

At operation 1125, the method includes performing an error detection procedure for the set of test frames using the cyclic redundancy check information to detect an error associated with the set of video frames of the output video stream.

In one or more embodiments the method further includes inserting one or more test frames into the one or more input video streams with a set of video frames, wherein the cyclic redundancy check information is generated based at least in part on bits of the one or more test frames.

In one or more embodiments the method further includes inserting test data into at least a portion of the set of test frames, wherein the cyclic redundancy check information is generated based at least in part on bits of the test data. In some embodiments, the portion of the set of test frames comprises a row of at least one test frame of the set of test frames, a column of at least one test frame of the set of test frames, or a combination thereof.

In one or more embodiments the method further includes selecting the set of test frames from a set of video frames of the one or more input video streams, wherein the cyclic redundancy check information is generated based at least in part on the selected test frames.

In one or more embodiments, the one or more input video streams comprise a plurality of input video streams, and generating the cyclic redundancy check information includes performing an alpha blending operation on the set of test frames associated with the plurality of input video streams.

In one or more embodiments the method further includes transmitting the output video stream from a display port that is coupled with the display controller, wherein the error detection procedure is performed prior to transmitting the output video stream from the display port.

In one or more embodiments the method further includes receiving, via a display port of a display receiving device of the display system, the output video stream at a display of the display receiving device, wherein the error detection procedure is performed after the output video stream is received at the display port of the display receiving device and prior to the output video stream being received at the display of the display receiving device.

In one or more embodiments performing the error detection procedure further includes replacing the set of test frames with a set of replacement video frames for the one or more input video streams. In some embodiments, the set of test frames are replaced with a set of previous video frames or pixels of the one or more input video streams. In some embodiments, the set of test frames are replaced with a corresponding row of a previous video frame, a corresponding column of the previous video frame, or a combination thereof. In other embodiments, the set of test frames are replaced with frames of choice. Frames of choice are not associated with input video streams at all, but rather retrieved from memory or obtained from another source. Similarly, one or more test rows of pixels or one or more test columns of pixels within the frames of choice may be used to replace one or more rows or one or more columns of pixels from the test frame. The pixels of choice are not associated with input video streams at all, but rather retrieved from memory or obtained from another source.

In one or more embodiments, two or more of operations 1105, 1110, 1115, or 1120 are substantially performed concurrently (simultaneously). In one or more embodiments, one or more operations of method 1100 may be performed in a different order than indicated by method 1100.

While the foregoing is directed to specific examples, other and further examples may be devised without departing from the basic scope thereof, and the scope thereof is determined by the claims that follow.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of protecting display data in a display system, comprising:

replacing one or more video frames from one or more input video streams with a set of alpha-blended test frames, each alpha-blended test frame generated by deterministically alpha-blending at least a portion of a set of test frames with at least a portion of the one or more input video streams;

generating an alpha-blended video stream having the alpha-blended test frames;

generating and inserting cyclic redundancy check information for the set of alpha-blended test frames into one or more secondary data packets associated with the alpha-blended video stream;

processing the set of test frames and the one or more video frames by a display controller to generate an output video stream; and performing an error detection procedure for the set of test frames using the cyclic redundancy check information to detect an error associated with video frames of the output video stream.

2. The method of claim 1, wherein the cyclic redundancy check information is generated based at least in part on the alpha-blended test frames.

3. The method of claim 1, further comprising:

inserting test data into at least a portion of the set of test frames, wherein the cyclic redundancy check information is generated for the portion of the set of test frames based at least in part on the alpha-blended test frames.

4. The method of claim 3, wherein the portion of the set of test frames comprises a row of at least one test frame of the set of test frames, a column of at least one test frame of the set of test frames, or a combination thereof.

5. The method of claim 1, further comprising:

selecting the set of test frames from the one or more input video streams, wherein the cyclic redundancy check information is generated based at least in part on the selected set of test frames.

6. The method of claim 1, further comprising:

transmitting the output video stream from a display port that is coupled with the display controller, wherein the error detection procedure is performed prior to transmitting the output video stream from the display port.

7. The method of claim 1, further comprising:

receiving, via a display port of a display receiving device of the display system, the output video stream at a display of the display receiving device, wherein the error detection procedure is performed after the output video stream is received at the display port of the display receiving device and prior to the output video stream being received at the display of the display receiving device.

8. The method of claim 1, wherein performing the error detection procedure further comprises:

replacing the set of test frames with a set of replacement video frames for the one or more input video streams.

9. The method of claim 8, wherein the set of test frames is replaced with a set of previous video frames or other frames of choice.

10. The method of claim 8, wherein test rows in the set of test frames are replaced with a test row of a previous frame or other rows of pixels of choice.

11. The method of claim 8, wherein test columns in the set of test frames are replaced with a test column of a previous frame or other columns of pixels of chosen.

12. A display system, comprising:

a display receiving device comprising a screen and a first display port coupled with the screen; and a display transmitting device comprising a display controller and a second display port coupled with the display controller and the second display port, wherein the display controller is configured to:

replace one or more video frames from one or more input video streams with a set of alpha-blended test frames, each alpha-blended test frame generated by deterministically alpha-blending at least a portion of a set of test frames with at least a portion of the one or more input video streams;

generate and insert cyclic redundancy check information for the set of alpha-blended test frames into one or more secondary data packets associated with an alpha-blended video stream;

process the set of test frames and the one or more video frames to generate an output video stream; and perform an error detection procedure for the set of test frames using the cyclic redundancy check information to detect an error associated with video frames of the output video stream.

13. The display system of claim 12, wherein the cyclic redundancy check information is generated based at least in part on the alpha-blended test frames.

14. The display system of claim 12, wherein the display controller is further configured to cause:

test data to be inserted into at least a portion of the set of test frames, wherein the cyclic redundancy check information is for the portion of the set of test frame based at least in part on the alpha-blended test frames.

15. The display system of claim 14, wherein the portion of the set of test frames comprises a row of at least one test frame of the set of test frames, a column of at least one test frame of the set of test frames, or a combination thereof.

16. An apparatus for a display transmitting device, comprising:

a display port;

a display controller coupled with the display port; and a processor and a memory, wherein the memory stores instructions that when executed by the processor causes the apparatus to:

generate cyclic redundancy check information for a set of alpha-blended test frames, each alpha-blended test frame generated by deterministically alpha-blending at least a portion of a set of test frames with at least a portion of one or more input video streams;

insert the cyclic redundancy check information into one or more secondary data packets associated with an alpha-blended video stream;

process, by the display controller, the set of test frames and the set of video frames associated with the alpha-blended test frames to generate an output video stream to be output from the display port; and perform an error detection procedure for the set of test frames using the cyclic redundancy check information to detect an error associated with video frames of the output video stream.

17. The apparatus of claim 16, wherein the instructions to further cause the apparatus to:

replace one or more video frames of one or more input video streams used to generate the alpha-blended video stream with the set of test frames, wherein the cyclic redundancy check information is generated based at least in part on the alpha-blended test frames.

18. The apparatus of claim 16, wherein the instructions further cause the apparatus to:

insert test data into at least a portion of the set of test frames, wherein the cyclic redundancy check information is generated for the portion of the set of test frames based at least in part on the alpha-blended test frames.

19. The apparatus of claim 18, wherein the portion of the set of test frames comprises a row of at least one test frame of the set of test frames, a column of at least one test frame of the set of test frames, or a combination thereof.

20. The apparatus of claim 16, wherein the instructions further cause the apparatus to:

select the set of test frames from one or more input video streams used to generate the alpha-blended video stream, wherein the cyclic redundancy check information is generated based at least in part on the selected set of test frames.

* * * * *